April 17, 1928. 1,666,766
J. S. ALSPAUGH
SPEED EQUALIZING MEANS FOR MOTOR VEHICLE TRANSMISSION SHAFTS
Filed Dec. 5, 1925
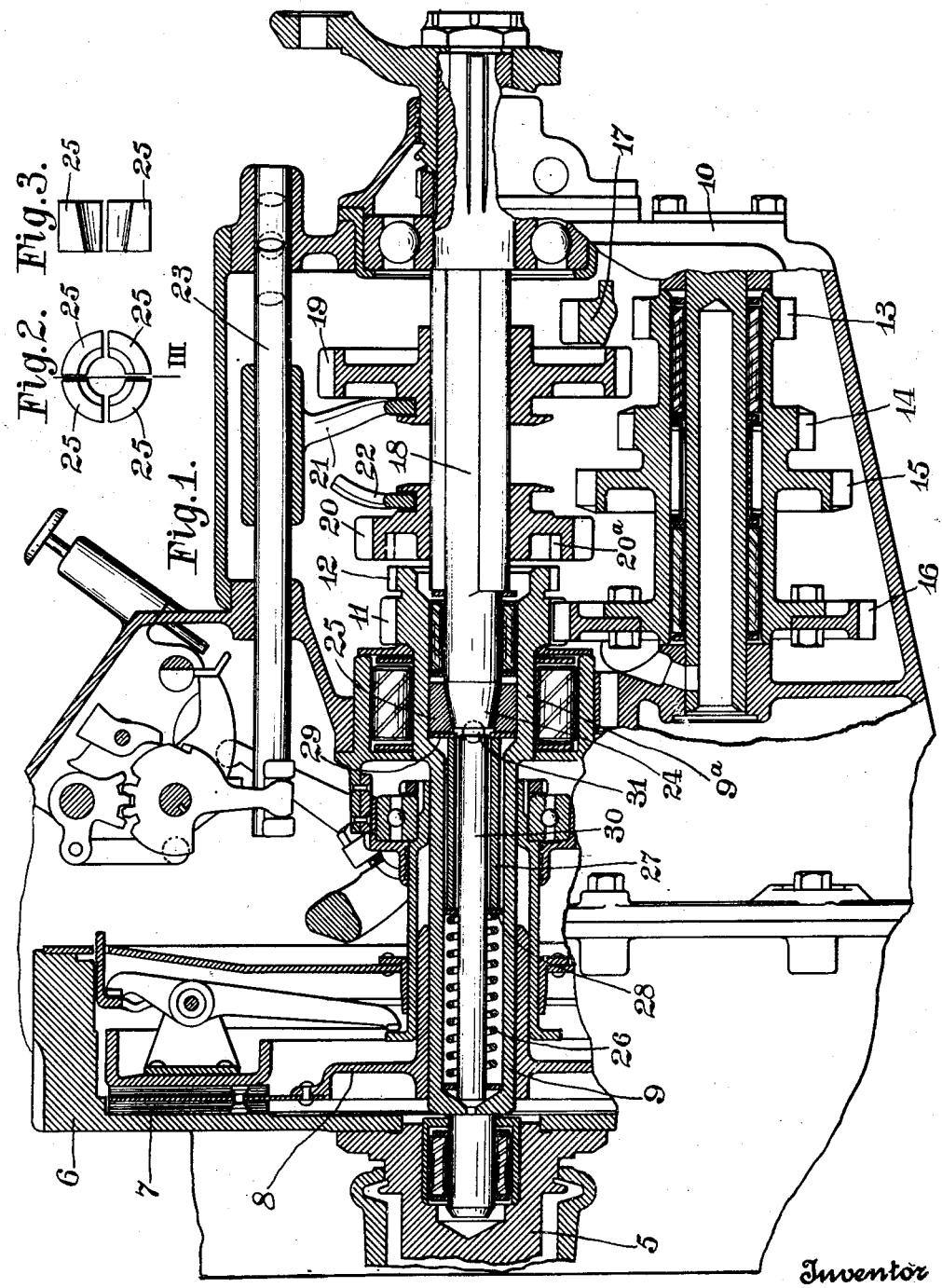
Inventor
JAMES S. ALSPAUGH Patented Apr. 17, 1928.

1,666,766

UNITED STATES PATENT OFFICE.

JAMES S. ALSPAUGH, OF COLUMBUS, OHIO.

SPEED-EQUALIZING MEANS FOR MOTOR-VEHICLE TRANSMISSION SHAFTS.

Application filed December 5, 1925. Serial No. 73,486.

This invention relates more especially to the driving and gear shifting means of automotive vehicles and has for its main object to provide improved and simplified means for synchronizing as far as practicable the speeds of the change speed gears so that the operation of gear shifting shall be easy and noiseless. Other objects will appear from the disclosure herein.

As well understood in such vehicles the power to drive such vehicle is transmitted from the crank shaft or fly wheel thereon to the rear axle by the interposition of a clutch under the control of the driver and a speed changing mechanism also under the control of the driver.

It will be remembered that in such vehicles the drive shaft is turned by the rear wheels due to the momentum of the vehicle when changing speeds or by the gravity of the vehicle when the gears are in neutral and the vehicle coasting down hill. In this latter case if the hill be long the engine and clutch shaft are oftentimes stopped by shutting off the power or left to run slowly clutched together. But when the clutch is removed the clutch shaft is left free between the engine and drive shaft, hence the clutch shaft tends to stop or to rotate at a greater speed according to circumstances thereby interfering more or less with the changing of the speed gears. My invention tends to reduce or prevent the difference between the speeds of these two shafts or permits or causes an equalization of the speeds of the two shafts when the clutch shaft is released.

In the accompanying drawing—

Figure 1 is mainly a vertical section taken centrally and longitudinally through the fly wheel and clutch shaft illustrating my improved connection between the clutch shaft and drive shaft.

Fig. 2 is a view of one face of the frictional clutching device used in the construction.

Fig. 3 is a view of half the same from the line III, Fig. 2.

In the views 5 designates the power or crank shaft of the engine, said shaft having secured to its rear end the usual fly wheel 6. The character 7 designates the clutch member of the disk which under pressure of a spring bears on the fly wheel said member carrying a spider sleeve 8 having affixed thereto a tubular shaft 9 mounted in line with the axis of the crank shaft and fly wheel and extending into the transmission and speed changing gear case 10. The clutch disk is operated to apply and remove pressure by the usual spring (as aforesaid) and foot lever for the purpose of operatively connecting the fly wheel with and disconnecting it from the clutch shaft 9. The rear end of the clutch shaft 9 is enlarged at 9ª and provided annularly with transmission gear portion 11 and a clutch element 12. Journaled in the lower portion of the case 10 is the tubular countershaft upon which are fixed toothed speed changing rims 13, 14 and 15 for transmitting reverse, low, and intermediate (or second) speeds respectively, the gear 16 on said countershaft being permanently engaged with the gear portion 11 of the clutch shaft 9 to give a reduced speed to the countershaft for the lower speeds and an offset gear 17 being provided as well understood to effect reverse.

The invention is embodied in the example herein shown and described, the features of novelty being finally claimed.

Journaled in the case 10 in line with the axis of the clutch shaft 9 is the sliding gear shaft 18 that is secured in the usual manner to the forward end of the drive shaft, said shaft 18 being splined and carrying slidable longitudinally thereon and rotatable therewith the sliding gears 19 and 20 (the latter having internal clutch teeth 20ª) for connection respectively with the reverse and low gears 17 and 14, and intermediate and high gears 15 and 12. The sliding gears 19 and 20 are shifted into and out of engagement by means of yoke arms 21 and 22 each secured on a gear shift rod like that shown at 23, said rod being at present more commonly controlled by a hand lever operated by the driver of the vehicle as well understood. In the drawing a special construction of mechanism for shifting said rods is partially indicated but such construction is not a part of the subject of the present application for patent.

According to my present invention as herein exemplified the forward end of the drive shaft 18 carrying the sliding gears enters the rear end of the clutch shaft 9 and is tapered to form a bearing 24 upon which is placed a ring sleeve composed of four arcuate sections 25 (see Figs. 2 and 3) having tapered internal bearing surfaces fitting on the tapered end 24 in frictional contact therewith and a cylindrical external bearing engaging the interior of the enlarged rear end 9ª of the clutch shaft 9. This sectional ring bearing is held in frictional engagement with the tapered end of the sliding gear shaft and the clutch shaft with a yielding pressure by means of a spring 26 in the forward end of the tubular clutch shaft 9, said spring pressing upon the forward end of tube 27 having its opposite ends armed with rings 28 and 29, the ring 28 to take directly the pressure of the spring and the other ring 29 to transmit pressure to the friction ring 25. Within the tubular clutch shaft 9 is a thrust bar 30 seated at its forward end against a seat in the forward end of the clutch shaft 9 and between the rear end of said bar 30 and the forward end of the drive shaft is a ball bearing 31 to hold the drive shaft in its proper position or prevent longitudinal forward shifting thereof.

The result of this mechanism is that the speed of the clutch shaft is equalized with that of the drive shaft and the speed changing gears kept moving thereby permitting the easy and noiseless engagement of the shifting gears with the speed changing gear.

The forms of the parts can be changed without departing from the gist of the invention as claimed.

What I claim is:

1. In means of the kind described, the combination of a power shaft, a clutch shaft, a speed changing gear shift mechanism of the sliding type including a sliding gear shaft and a clutching means between the sliding gear shaft and the clutch shaft in slipping relation to both shafts.

2. In means of the kind described, the combination of a power shaft, a clutch shaft, a speed changing gear shift mechanism of the sliding type including a sliding gear shaft, a clutching means between the sliding gear shaft and the clutch shaft in slipping relation to both shafts and means exerting a yielding pressure on said slipping clutching means.

3. In means of the kind described, the combination of a power shaft, a clutch shaft, a speed changing gear shift mechanism of the sliding type including a sliding gear shaft, a slipping clutching means between the sliding gear shaft and the clutch shaft and a thrust bar between the sliding gear shaft and the clutch shaft.

4. In means of the kind described, the combination of a power shaft, a clutch shaft, a speed changing gear shift mechanism of the sliding type including a sliding gear shaft, a slipping clutching means between the sliding gear shaft and the clutch shaft, means exerting a yielding pressure on said slipping clutching means and a thrust bar between the sliding gear shaft and the clutch shaft.

5. In means of the kind described, the combination of a drive shaft, a clutch shaft, a speed changing gear shift mechanism of the sliding type including a sliding gear shaft, a slipping clutch means between the sliding gear shaft and the clutch shaft consisting of an expansible ring-like member frictionally engaging the sliding gear shaft and means carried by the clutch shaft for yieldingly holding the same engaged with said sliding gear shaft.

6. In means of the kind described, the combination of a drive shaft, a clutch shaft, a speed changing gear shift mechanism of the sliding type including a sliding gear shaft, a slipping clutch means between the sliding gear shaft and the clutch shaft consisting of a ring-like member frictionally engaging both the sliding gear shaft and the clutch shaft and means carried by the clutch shaft for yieldingly holding the same engaged with said sliding gear shaft.

7. In means of the kind described, the combination of a drive shaft, a clutch shaft, a speed changing gear shaft mechanism of the sliding type including a sliding gear shaft, a slipping clutch means between the sliding gear shaft and the clutch shaft consisting of a tapered expansible split ring-like member frictionally engaging the sliding gear shaft, and means carried by the clutch shaft for yieldingly holding the same engaged with the sliding gear shaft.

JAMES S. ALSPAUGH.